No. 611,355. Patented Sept. 27, 1898.
L. T. CORNELL.
PEDAL.
(Application filed Aug. 10, 1896.)
(No Model.)

Witnesses.
Wm. W. Rheem
Wm. O. Belt

Inventor
Lewis T. Cornell
by
Raymond & Omohundro
Atty's.

THE NORRIS PETERS CO., PHOTO-LITHO., WASHINGTON, D. C.

UNITED STATES PATENT OFFICE.

LEWIS T. CORNELL, OF CHICAGO, ILLINOIS, ASSIGNOR TO PARKHURST & WILKINSON, OF SAME PLACE.

PEDAL.

SPECIFICATION forming part of Letters Patent No. 611,355, dated September 27, 1898.

Application filed August 10, 1896. Serial No. 602,290. (No model.)

*To all whom it may concern:*

Be it known that I, LEWIS T. CORNELL, a citizen of the United States, residing at Chicago, in the county of Cook and State of Illinois, have invented certain new and useful Improvements in Pedals, of which the following is a full, clear and exact description, reference being had to the accompanying drawings, forming a part of this specification.

My invention relates to certain new and useful improvements in pedals for bicycles and other vehicles, its primary object being to provide a substantial and simple pedal which shall be dust-proof and the bearings and other parts of which are protected from accidents to which these parts are generally exposed.

A further object of the invention is to provide a pedal the parts of which can be easily and readily assembled and adjusted in proper relation to each other to make a pedal of extreme simplicity and great rigidity, which will at the same time turn and operate in an easy manner.

Another object of the invention is to construct a pedal of few parts, which are arranged to coöperate with each other to give the pedal great strength and to reduce the liability of injury by accident to the operative parts.

With these and other ends in view my invention is illustrated in the accompanying drawings, in which—

Figure 1:
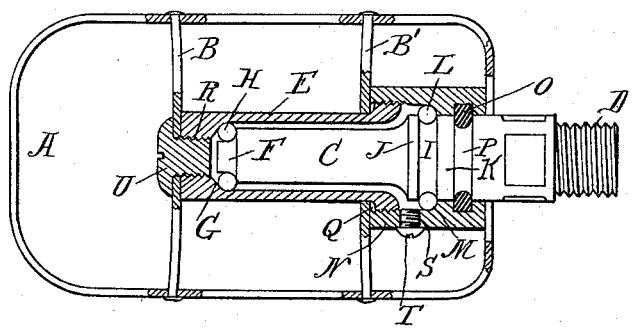
Figure 2:
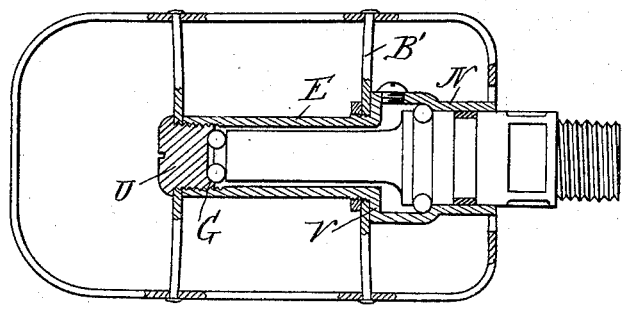
Figure 5:
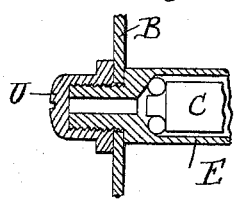
Figure 3:
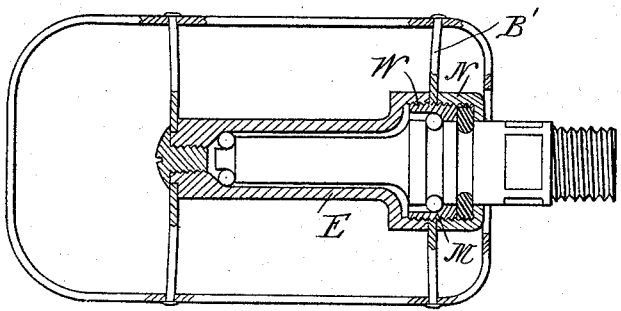
Figure 4:
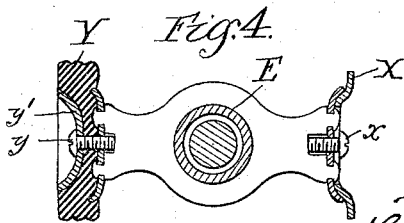

Figure 1 is a horizontal sectional view showing the practical construction of the pedal. Fig. 2 is a similar view in which the sleeve E and collar N are made in one piece instead of in two pieces, as shown in Fig. 1. Fig. 3 is a horizontal sectional view of a pedal embodying some additional features of construction more particularly pointed out hereinafter. Fig. 4 is a transverse sectional view of one of the pedals. Fig. 5 is a detail sectional view showing the manner in which a cap may be employed to perform the functions of the screw U.

Referring to the drawings, in which like letters of reference denote corresponding parts in all the figures, and particularly at first to Fig. 1, A designates the frame of my improved pedal, which is made in the usual rectangular form and provided with the connecting-braces B B', which hold the sides of the frame together in a firm and rigid manner, as hereinafter described.

The pedal-pin C is provided with a threaded end D, by which it is connected to the crank-arm of the machine, and its inner end extends into a sleeve E, which is arranged between the two braces B B'. The inner end of the pedal-pin is provided with a cone F, and the sleeve has a cup-recess G to form, with the cone F, a race for the balls H. Another cone I is formed on the pedal-pin between the peripheral ribs J and K, a series of balls L being arranged to operate between said cone and the cup-recess M in the collar N. This collar is also provided with a recess to receive the packing-ring O, which projects into a peripheral groove P in the pedal-pin when the parts are assembled.

The collar N is internally threaded, so that it can be adjustably secured on the externally-threaded enlarged end Q of the sleeve E, which projects through an opening provided for it in the adjacent brace B'.

In assembling the parts of the pedal as herein described the sleeve E is first arranged in its position between the braces B B', and then the pedal-pin is inserted in the sleeve. The balls H are inserted through the opening R in the end of the sleeve, so that they will assume their proper position in the ball-race between the cone F and the cup G, and then, the packing-ring O having been previously arranged in the groove P, the collar N is screwed onto the enlarged end Q of the sleeve. The balls L are then inserted through an opening S in the side of the collar N, said opening having first been arranged in such a position with relation to the cone I that the balls inserted therethrough will rest in said cone, after which the opening S is closed by a screw T, and the collar N is adjusted until the balls have assumed their proper position in the race provided between the cone I and the cup M. When the balls have been properly inserted, the collar N is adjusted on the enlarged threaded end of the sleeve until the bearings have been tightened, so that they will operate in the best manner, this adjustment of course being a matter of skill and observation. The parts having been adjusted as described, it will be observed that the collar N is bearing against the brace B', and to finally secure these inner parts in their proper position a screw U is adapted to be adjusted in the internally-threaded opening R in the end of the sleeve, and this screw is provided with an enlarged head, which bears against the outer side of the brace B, whereby it will be observed that as the screw U is tightened the collar will be drawn against the brace B' and the braces B B' will be more or less sprung inwardly. It should be noted that the length of that portion of the sleeve E between the two braces B B' is less than the actual distance between said braces before they have been sprung inwardly toward each other by the adjustment of the screw U, so that when said screw is adjusted all the parts of the pedal will be tightened together.

From the foregoing description of my invention it will be observed that the bearings are adjusted against each other by the adjustment of the collar N and that the sleeve, the collar, and the pedal-pin are all secured in the frame of the pedal by the adjustment of the screw U. This provides a pedal of great rigidity, all the parts of which are connected together and secured substantially by means of a single screw, which holds them tightly in the desired position. The construction and arrangement of the parts and the manner of joining the parts together are such that the liability of dust entering the bearings is reduced to a minimum; but the packing-ring O effectually prevents dust getting in from that end of the pedal.

Another important feature of my invention is the arrangement of the bearings at that portion of the frame which receives the greatest amount of pressure from the rider's foot, the sleeve, pedal-pin, and collar being located entirely on one side of the brace B, which concentrates the strength of the pedal and provides a firm rest for the rider's foot, the interior parts of the pedal being assembled and adjusted together in such a manner that they will not become broken or disarranged by any ordinary accidents.

In Fig. 2 the construction is substantially in every respect the same as that hereinbefore described, and shown in Fig. 1, with the exception that the sleeve E and the collar N are made integral and provided with a shoulder V, which corresponds to the end of the collar N of Fig. 1 and bears against the brace B'. The cup-recess G in this construction is formed on the inner end of the screw U.

In Fig. 3 the sleeve E terminates on the inner side of the brace B', and it is internally threaded to receive an exteriorly-threaded sleeve W, which has the cup-recess M on its inner side. The collar N is screwed onto this sleeve W and against the brace B', the said sleeve W forming in effect a connection between the end of the sleeve E and the collar N, whereby the said parts can be adjusted securely on the brace B' to prevent the entrance of dust into the bearings.

The general construction of the frame is preferably as outlined in the foregoing description; but I would have it distinctly understood that I do not limit myself to any particular construction, as my invention may be adapted to many different kinds of pedal-frames.

In Fig. 4 I have shown a transverse view of the pedal, on one side of which a rat-trap tread-piece X is secured by means of the screw $x$ and on the other side of which a rubber tread-piece Y is secured by means of the screw $y$ and the plate $y'$, it being understood, of course, that when a pedal of the rat-trap style is desired both sides of the pedal will be supplied with the rat-trap tread-piece X, and when a rubber pedal is desired the tread-piece X of Fig. 4 would be replaced by a rubber tread-piece Y.

My improved pedal is strong and durable, and the parts are held together in a firm and rigid manner, so that the bearings will be fully protected from accidental injury, and the bearings are so arranged that the adjustment thereof is simultaneous and can be made easily and quickly, after which they are permanently secured by the screw U, which secures these interior parts in the frame.

Instead of using the screw U in the form shown in Figs. 1, 2, and 3 I may employ an internally-threaded cap, as shown in Fig. 5, which is adapted to be screwed upon the end of the sleeve E, which in this case is extended through the brace.

I am aware that changes in the form and proportion of parts and details of construction of my invention may be made without departing from the spirit and without sacrificing the advantages thereof, and I would therefore have it understood that I reserve the right to make all such changes as fairly fall within the scope and spirit of my invention.

Having thus fully described my invention, what I claim, and desire to secure by Letters Patent, is—

1. The combination with a pedal-frame having the transverse braces, of a sleeve, a pedal-pin arranged in the sleeve, a collar around said pedal-pin adapted to engage one of the braces and connected to one end of the sleeve, and a screw adapted to be adjusted in the other end of the sleeve to draw the collar against one of said braces and having an enlarged head to bear against the other brace, substantially as described.

2. The combination with a pedal-frame having the transverse braces, of a pedal-pin, a sleeve surrounding one end of said pin and projecting through one of said braces, that portion of the sleeve between the braces being of less length than the actual distance between the braces before the parts are adjusted and secured together, a collar connected to said sleeve, said collar being outside of one brace and adapted to bear against it, inwardly-facing bearing-cups formed in the collar and sleeve, bearing-balls in said cup, and means bearing against the outside of the other brace for securing the sleeve, the collar and the pedal-pin to the pedal-frame and springing the braces inwardly to secure the parts rigidly together, substantially as described.

3. The combination with a pedal-frame having transverse braces, of a sleeve, a pedal-pin arranged in said sleeve, a collar connected to one end of the sleeve and adapted to bear against the outer side of one of said braces and means adjustably connected with the end of the sleeve and bearing against the outer side of the other brace for springing that brace against the end of the sleeve and springing the braces toward each other to secure and tighten the parts in the pedal-frame, substantially as described.

4. The combination with a pedal-frame having transverse braces, of a sleeve, a pedal-pin arranged in said sleeve, a collar on the sleeve between one brace and the adjacent end of the frame and adapted to bear against the outer side of said brace, inwardly-facing bearing-cups formed in the collar and sleeve, bearing-balls in said cups, and a screw bearing against the brace at the outer end of the sleeve and operating in the end of said sleeve for securing the sleeve, the collar and the pedal-pin in the frame, substantially as described.

5. The combination with a pedal-frame having the transverse braces B, B' within said frame and between its ends, of a sleeve arranged between said braces, that portion of the sleeve between the braces being of less length than the actual distance between the braces before the parts are adjusted and secured together, a collar located between one brace, B', and the adjacent end of the frame, said collar being connected to the end of the sleeve and bearing against the brace, a pedal-pin extending through the sleeve, the collar and the end of the frame adjacent to the brace B' and a screw bearing against said brace B at the outer end of the sleeve for springing the braces toward each other to tighten and secure the parts in the frame, substantially as described.

6. The combination with a pedal-frame having the transverse braces between its ends, of a sleeve arranged between said braces, that portion of the sleeve between the braces being of less length than the actual distance between the braces before the parts are adjusted and secured together, a pedal-pin arranged in said sleeve, a collar located between one brace and the end of the frame and around the pedal-pin, a row of balls between the end of the pedal-pin and the sleeve, another row of balls between the pedal-pin and the collar, and a screw operating through one brace and into the end of the sleeve and having an enlarged head bearing against the outer side of said brace to spring the braces toward each other and secure the parts in the pedal-frame, substantially as described.

7. The combination with a pedal-frame having the transverse braces, of a sleeve, a pedal-pin provided with a cone at its end, a row of balls operating in the race between said cone and a cup in the sleeve, a collar adjustably connected to one end of the sleeve and adapted to bear against one of the transverse braces, a cone formed on the pedal-pin and forming a race for a row of balls with a cup in the collar, a packing-ring between said collar and pedal-pin, and a screw adapted to be adjusted in the end of said sleeve and having an enlarged head adapted to bear against one of the braces to secure the parts in place, substantially as described.

LEWIS T. CORNELL.

Witnesses:
  M. E. SHIELDS,
  WM. O. BELT.